Sept. 1, 1931.   W. U. SNYDER ET AL   1,820,991
CLUTCH MECHANISM
Filed May 17, 1928   2 Sheets-Sheet 1
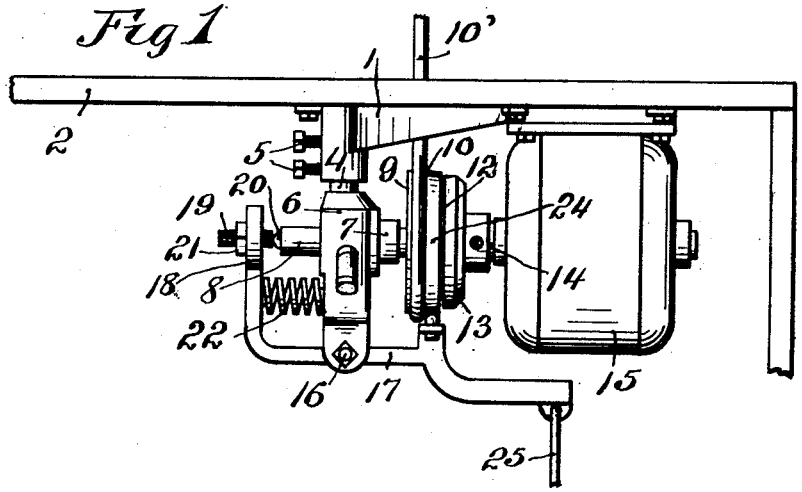
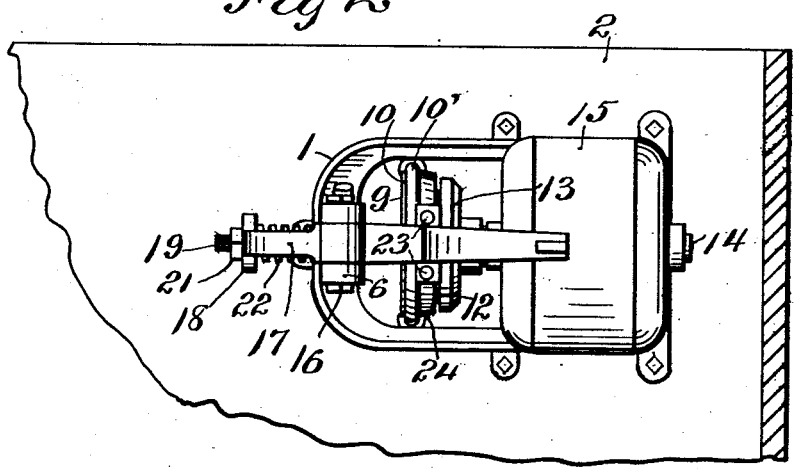
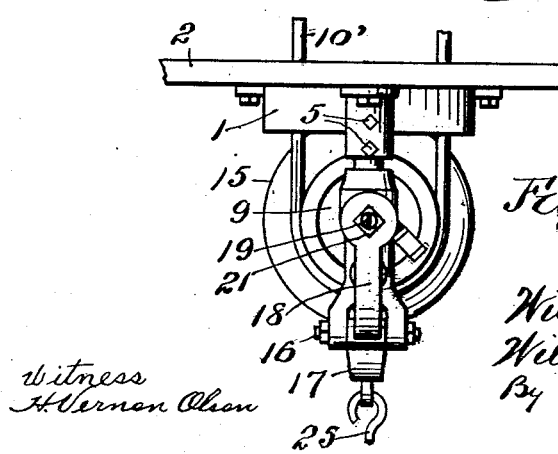
William U. Snyder
William T. Hess,  INVENTORS
By Warren D. House
Their ATTORNEY
Witness
H. Vernon Olsen Sept. 1, 1931.  W. U. SNYDER ET AL  1,820,991
CLUTCH MECHANISM
Filed May 17, 1928  2 Sheets-Sheet 2
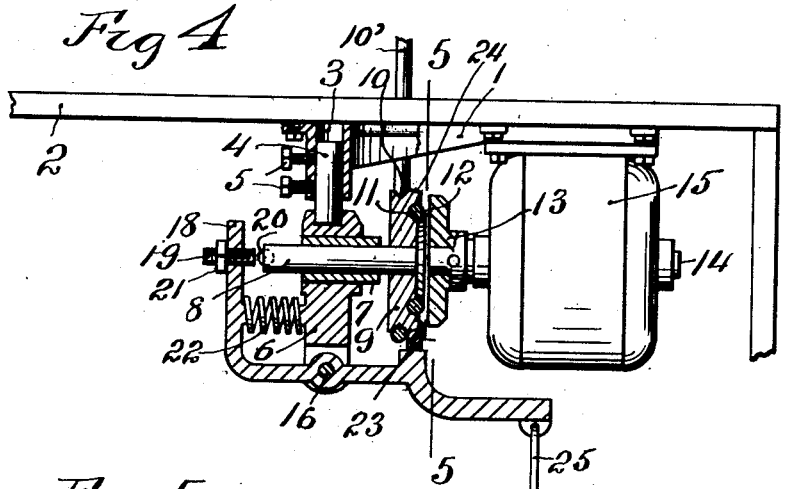
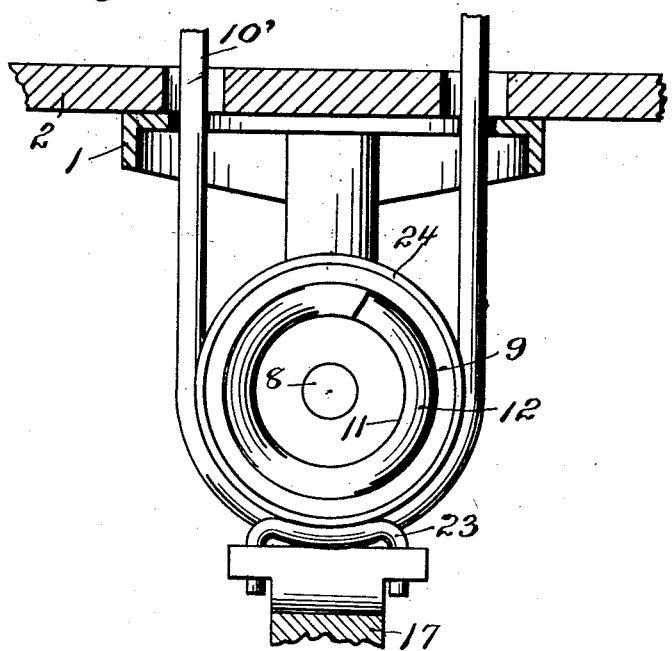
INVENTORS
William U. Snyder
William T. Hess
By Warren D. House
Their ATTORNEY
Witness
H. Vernon Olson Patented Sept. 1, 1931

1,820,991

UNITED STATES PATENT OFFICE

WILLIAM U. SNYDER AND WILLIAM T. HESS, OF KANSAS CITY, MISSOURI

CLUTCH MECHANISM

Application filed May 17, 1928. Serial No. 278,361.

Our invention relates to improvements in clutch mechanisms. It is particularly adapted for use in transmitting power from an electric or other motor to machines, such as sewing machines, grinding or polishing machines or other machines intended and adapted to be driven by a belt or other connecting means.

One of the objects of our invention is to provide a novel clutch mechanism in which the driven and the driving clutch members are altogether out of driving or contacting engagement with each other, excepting at such times as it is desired to operatively use the mechanism, thereby eliminating wear.

A further object of our invention is to provide a novel clutch mechanism of the kind described, which is simple, cheap, durable, not likely to get out of order, which is efficient in operation, and which is easily and quickly installed where it is to be used.

The novel features of our invention are hereinafter fully described and claimed.

In the accompanying drawings, which illustrate the preferred embodiment of our invention, Fig. 1 is a side elevation of our improved mechanism shown mounted in connection with an electric motor of usual type, the clutch members being shown in driving engagement with each other.

Fig. 2 is an under view of the same.

Fig. 3 is an end elevation of the same.

Fig. 4 is a view in which the motor and our improved mechanism are shown partly in vertical section and partly in side elevation, the clutch members being shown detached from each other.

Fig. 5 is an enlarged section on the line 5—5 of Fig. 4.

Similar reference characters designate similar parts in the different views.

Our improved clutch mechanism comprises a suitable support, which, as shown, comprises a bracket 1 attached to the under side of a bench or table 2, and which has a vertical hole 3 in which is vertically slidable and rotatable a stud 4, which is held in its adjusted position by set screws 5 in the bracket 1.

The stud 4 is mounted in the upper end of a bearing member 6 containing a bushing 7 in which is rotatably mounted and longitudinally slidable a horizontal shaft 8 which carries and has fastened to it a driven clutch member 9 having a peripheral groove 10 in which is mounted a belt 10' adapted to be connected with a machine to be driven, not shown.

The driven clutch member 9 has in one side an annular groove 11 in which is mounted a friction member 12, which may be a round strip of leather, and which is normally out of engagement with but is adapted for driving engagement with a plane side of a driving clutch member 13, which is mounted and rotates with a horizontal armature shaft 14 of an ordinary electric motor 15, which is bolted to the under side of the bracket 1.

For forcing the clutch member 9 into driving engagement with the clutch member 13, there is pivoted to the bearing member 6 by a horizontal pin 16, an operating lever 17 having an upstanding arm 18 carrying a horizontally adjustable screw 19, which is adapted to have one end engage a ball 20 rotatable in the adjacent end of the shaft 8. The screw 19 may have a lock nut 21 adapted to bear on the arm 18 to hold the screw in its adjusted position.

A coil spring 22 has one end bearing on the arm 18 and the other end bearing against the bearing member 6. This spring normally forces the lever to swing the screw 19 from the ball 20.

For moving the clutch member 9 out of driving engagement with the clutch member 13, and at the same time apply a braking pressure to the clutch member 9, for quickly stopping it, there is provided a brake shoe, which, as shown, comprises a round strip of leather 23, Fig. 5, embracing a portion of the periphery of the clutch member 9, the end portions of the strip 23 being inserted through two vertical holes in the lever 17. The portion 24 of the clutch member 9 engaged by the brake shoe 23 is an annular peripheral portion which is bevelled and converges toward the clutch member 13.

When the right end of the lever 17, Fig. 4, swings upwardly, due to the lever being released and so forced by the spring 22, the shoe 23 by engaging the bevelled portion 24 of the clutch member 9 will force the latter clear of the clutch member 13, there then being a space, as shown in Fig. 4, between the friction member 12 and the plane face of the clutch member 13, so that there is no contacting surface between the clutch members.

At the same time that the brake shoe 23 bears against the bevelled portion 24, a braking pressure will be applied by the brake shoe to the driven clutch member 9, thus causing the latter to quickly stop. The brake shoe 23 thus effects a double function that of forcing the driven clutch member to the inoperative position and simultaneously applying the braking pressure thereto.

Any suitable means may be employed for swinging the right end of the lever 17, as shown in Figs. 1 and 4, downwardly, as by a depressing rod 25, a portion only of which is shown, and the lower end of which may be attached to an ordinary pedal, not shown.

In setting up the mechanism, the stud 4 is adjusted in the hole 3, so as to aline axially the shaft 8 with the armature shaft 14.

In the operation of the invention, to drive the clutch member 9, the rod 25 is depressed thus swinging the lever so that the screw 19 will force the shaft 8 to the right, Figs. 1 and 4, until the friction member 12 has driving engagement with the clutch member 13, the motor 15, at the time being in operation. The clutch member 13 will effect the rotation of the clutch member 9, through the intermediacy of the friction member 12, and the belt 10' will be driven.

When the lever is released, the spring 22 will swing it upwardly, as viewed in Fig. 4, at its right end, thus causing the brake shoe 23 to engage the bevelled portion 24 and thereby forcing the clutch member 9 to the left out of engagement with the clutch member 13, and at the same time exerting a braking pressure against the periphery of the clutch member 9 and bring the latter quickly to a stop.

When worn, the leather strips 12 and 23 may be readily replaced by the owner of the machine or its user.

We do not limit our invention to the structure shown and described, as many modifications, within the scope of the appended claim, may be made without departing from the spirit of our invention.

What we claim is:—

In a clutch mechanism the combination with a support, a rotary driving clutch member, and means supporting said driving member on said support, of bearing means adjustable on said support lengthwise of and circumferentially on an axis intersecting the axis of said driving member, a shaft rotatable and slidable on said bearing means independently of and adapted for alinement axially with said driving member, a driven clutch member carried by said shaft, and means carried by said bearing means adapted to engage and force said shaft lengthwise so as to operatively engage said driven clutch member with said driving clutch member.

In testimony whereof we have signed our names to this specification.

WILLIAM U. SNYDER.
WILLIAM T. HESS.